United States Patent
Neukum

Patent Number: 5,280,851
Date of Patent: Jan. 25, 1994

[54] SOLDERING-VAPOR EXHAUST DEVICE

[75] Inventor: Alfred Neukum, Straubenhardt, Fed. Rep. of Germany

[73] Assignee: Newlab Electronic S.A., Le Locle, Switzerland

[21] Appl. No.: 910,884

[22] Filed: Jul. 9, 1992

[51] Int. Cl.[5] .............................................. B23K 3/00
[52] U.S. Cl. .................................. 228/20.5; 228/8; 219/230
[58] Field of Search ............... 228/20 HT, 52, 8, 56.5, 228/20.5; 219/230, 240, 236

[56] References Cited

U.S. PATENT DOCUMENTS

| | | | |
|---|---|---|---|
| 4,358,662 | 11/1982 | Cranor et al. | 228/20 HT X |
| 4,418,268 | 11/1983 | Munshaw | 219/240 X |
| 4,607,151 | 8/1986 | Kihlstrom | 228/20 HT X |
| 4,948,946 | 8/1990 | Fukunaga | 228/20 HT X |
| 5,080,277 | 1/1992 | Diaconu et al. | 228/42 |

Primary Examiner—Richard K. Seidel
Assistant Examiner—Jeanne M. Elpel
Attorney, Agent, or Firm—Darby & Darby

[57] ABSTRACT

Soldering-vapor exhaust device comprising vacuum generator means and filter arrangements for filtering and for the direct evacuation of soldering vapors at a soldering point, via a suction pipe provided on a soldering iron, the latter being provided with a suction opening adjacent to the soldering bit of the soldering iron and connected to the filter arrangement via a suction line, the vacuum generator means comprising a linear motor acting as pumping means, arranged downstream of the filter means in an intake chamber and being driven by an electromagnetic a.c. field, and which serves a pumping means.

15 Claims, 3 Drawing Sheets

SOLDERING-VAPOR EXHAUST DEVICE

The present invention relates to a soldering-vapor exhaust device having vacuum generator means and filter arrangements for filtering and for the direct evacuation of soldering vapors at a soldering point, via a suction pipe provided on a soldering iron, the latter being provided with a suction opening in the neighborhood of the soldering bit of the soldering iron and connected to the filter arrangement via a suction line.

It has been known before to exhaust the soldering vapors produced when working with a soldering iron directly via a suction pipe mounted on the soldering iron, in order to prevent, or in any case to considerably reduce, the risk of irritations of the membranes of the eyes and the respiratory tracts of the person using the soldering iron. One makes use for this purpose of soldering-vapor exhaust devices comprising a vacuum generator by means of which the vacuum required for exhausting the soldering vapors is produced in the suction pipe ending near the soldering bit. The exhausted soldering vapors are guided through filter arrangements which keep back the harmful constituents of the soldering vapors.

For generating the vacuum in soldering-vapor exhaust devices of the contemplated kind, one has made use heretofore of turbines and, on the other hand, of piston pumps as it had been found that it was not possible with the aid of the usual radial-flow or axial-flow compressors to produce at the relatively small orifice or suction opening of the suction pipe a vacuum sufficient to carry off quickly and reliably the vapors produced during soldering.

However, the use of usual piston pumps and turbines as vacuum generator means is connected with a considerable development of noise which, under continuous operating conditions, is also detrimental to the user's health, and when turbines are used as vacuum generators, one has to cope with the additional disadvantage that in practice they cannot be switched off when soldering is interrupted since it takes one minute or more to run them up again to their rated speed and, thus, to their full volumetric capacity at which the desired extraction of the harmful soldering vapors can be guaranteed.

Also, when a common soldering-vapor exhaust device is used in the known manner to exhaust the soldering vapors at a plurality of soldering irons it has not been possible heretofore to switch off the vacuum generator means when soldering is interrupted at one or more of the soldering irons.

Proceeding from the state of the prior art and the beforedescribed problems, it is the object of the present invention to provide an improved soldering-vapor exhaust device which distinguishes itself by low noise generation, which can be switched off when soldering is interrupted and which is comparatively simple and cheap to produce.

The invention achieves this object with a soldering-vapor exhaust device of the before-described kind by the fact that the vacuum generator means comprises a linear motor which is arranged downstream of the filter means in an intake chamber and driven by an electromagnetic a.c. field, and which serves a pumping means.

It is a particular advantage of the soldering-vapor exhaust device according to the invention that the vacuum is generated by a linear motor which, compared with piston pumps and turbines, generates only little noise and which in addition can be switched off at any time if soldering is interrupted, even for a short time, since after restarting it will immediately operate at its full volumetric rating.

According to a further development of the invention it has been found to be of advantage if the linear motor can be controlled in response to the operation of the soldering iron. Preferably, the control of the linear motor in response to the operation of the soldering iron is implemented in such a way that a switching element, in particular one of the contactless type, is provided on a holder assigned to the soldering iron and arranged in the usual manner at the working position, which switching element serves to detect the presence of the soldering iron in the holder and to emit a corresponding signal by means of which the linear motor can be switched off either directly or, preferably, via timer in order to ensure that any vapors that may continue to rise from the bit of the soldering iron after termination of the soldering work will also be reliably carried off.

According to a further development of the invention, it has been found to be of advantage if the filter arrangement comprises three separate filter units, in particular a particle filter, followed by a filter arrangement consisting of a microfilter and an activated charcoal filter. The filter units used may be commercially available filter units, for example a commercial air filter for vehicles to serve as particle filter, a commercial microfilter (according to DIN 3183) and a commercial activated charcoal filter according to DIN 3181; such filters are normally used in breathing equipment.

According to an advantageous embodiment of the invention, it has also been found to be of particular advantage if a silencer is provided on the outlet end of the linear motor, which latter is also commercially available and need not be especially adapted for use in a soldering-vapor exhaust device according to the invention.

According to one embodiment of the invention, such a silencer is implemented by the fact that an outlet chamber in the form of an expansion chamber is arranged in the bottom area of a common outer housing for the filter arrangement and the linear motor, which expansion chamber communicates with the outside via an exhaust pipe tuned to the pressure fluctuations to be expected.

Further details and advantages of the invention will be described in more detail hereafter with reference to the drawings in which.

Figure 1:
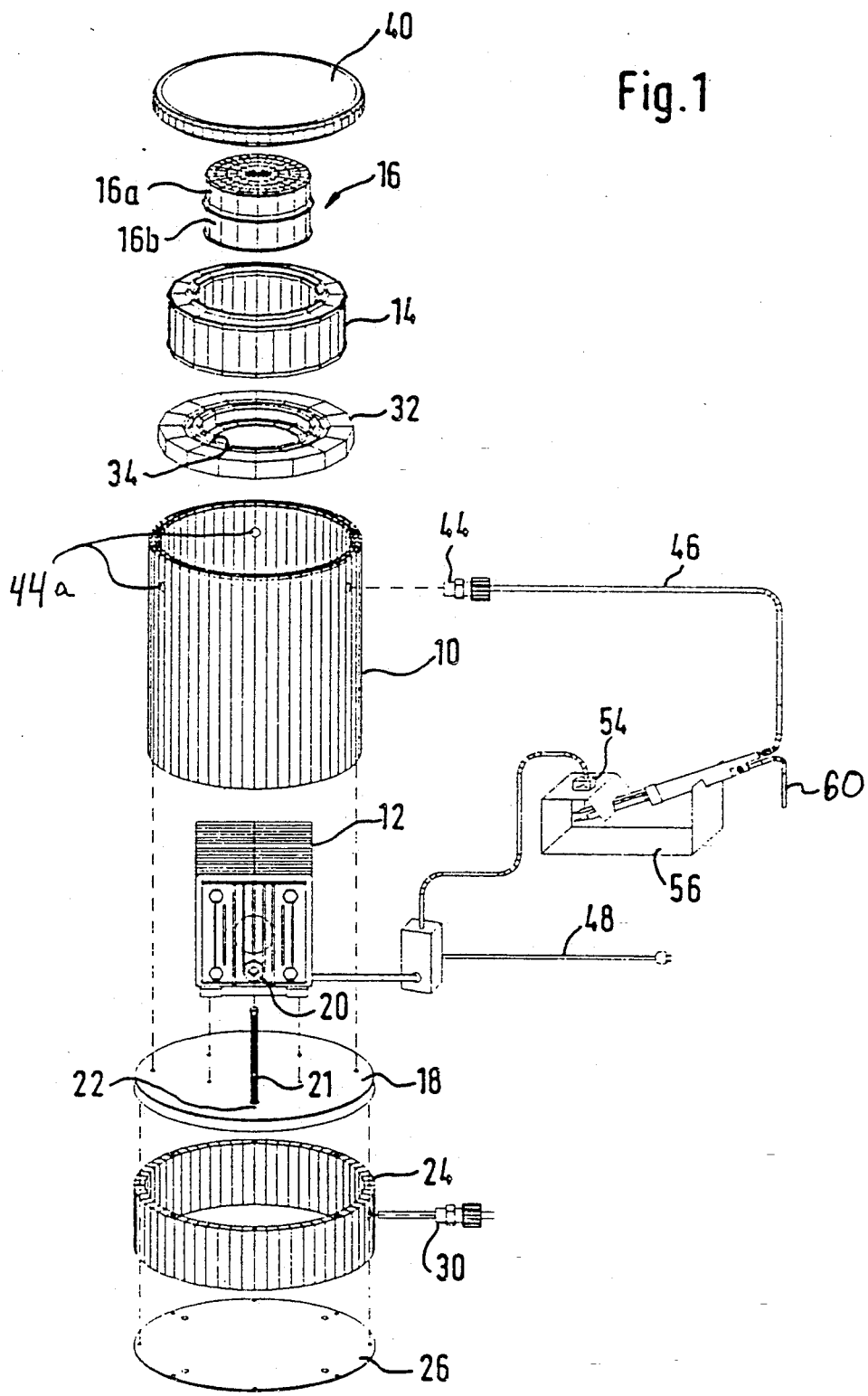
FIG. 1 shows a diagrammatic, perspective exploded view of a preferred embodiment of a soldering-vapor exhaust device according to the invention.

Regarding now FIG. 1, a soldering-vapor exhaust device comprises a tubular housing 10 containing all the other components of the exhaust device, the main components consisting of a linear motor 12 and two separate filter arrangements 14, 16, i.e. a preliminary filter or a coarser particle filter, and a filter arrangement 16 comprising a microfilter 16a and a gas filter 16b, especially in the form of an activated charcoal filter.

In practice, the housing 10 is a robust, tubular plastic housing having, for example, a diameter of approximately 200 mm and a height of approximately 270 mm. A mounting plate 18, on which the linear motor 12 is firmly mounted, in particular by means of screws, is screwed into the lower end of the housing 10, or is connected with the latter firmly and in tight relationship in some other way. An outlet 20 of the linear motor is connected in tight relationship with an outlet opening 22 of the mounting plate 18 via a pipe bend or a hose end 21. Mounted in tight relationship to the bottom of the mounting plate, opposite the housing 10, is a spacer ring 24 which is sealed on its outside by an end plate. The mounting plate 18, the spacer ring 24, and the end plate 26 define together a damping or expansion chamber 28 adjoining the outlet opening 22 of the mounting plate 18 and communicating with the atmosphere via an exhaust pipe 30.

Above the linear motor 12, a separating plate 32 is mounted inside the housing 10. The edge of the separating plate 32 is sealed around its circumference against the adjoining inner wall of the housing 10, which is provided with a shoulder, and is provided with a central opening 34. A flexible seal (not shown in the drawing) arranged above the separating plate 32 is also provided with a central opening, which is in alignment with the central opening 34 of the separating plate. The two central openings together form a receiving opening adapted to accommodate the filter arrangement 16 in sealing relationship. The particle filter 14 exhibits an annular shape and has its lower face resting on the separating plate 32. After final assembly, when the exhaust system is in its operative condition, the filter arrangement 16 is located inside the particle filter 14. Above the two filter arrangements 14, 16, the housing 10 is sealed by a lid 40 which is in contact with the upside of the filter arrangement 14 so as to secure the latter in its position. The second filter arrangement 16 is clamped in position in the central opening 34 of the separating plate 32 by means of the before-mentioned seal.

In the illustrated embodiment of the invention, screwing holes 44a spaced by 120° in the circumferential direction, are provided in the housing wall, in the area between the separating plate 32 on the one hand and the lid 40 on the other hand, for receiving fittings 44 for the tight connection of a hose-like suction line 46.

The lid 40 can be detachably fixed on the housing 10 by means of spring clips (not shown in the drawing), and its bottom facing the housing preferably is provided with a groove accommodating an O-ring resting against the end face of the housing body in sealing and elastic relationship.

Figure 3:
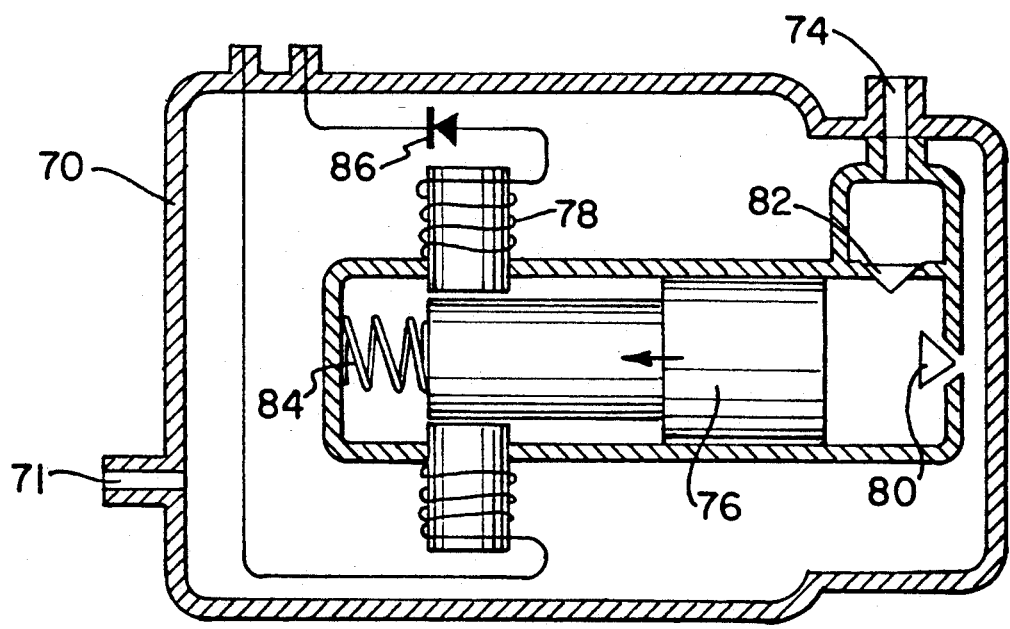
FIG. 3 is a diagrammatic representation of a linear motor.

The linear motor (FIG. 3) comprises a main piston chamber 70 having air inlet 72 and outlet 74 openings and a piston 76 moving reciprocately within said chamber. The chamber and piston form the core for an electromagnetical coil 78, whereas the movement of the piston under the influence of the electromagnetic alternating field originating from this coil generates alternately suction and exhaust pressure states governed by valve means 80 and 82 arranged in said openings. Most preferably the piston is spring-biased and moved against the spring tension 84 by a first (positive) half-cycle of the alternating supply voltage which generates the electromagnetic field. Because the second (negative) half-cycle of the supply voltage may be blocked e.g. by using a series diode 86, the spring is released and moves the piston back to its starting position, from which the next (positive) half-cycle again urges the piston into movement against spring tension thereby successively increasing and decreasing the respective chamber volume and generating these suction and exhaust pressure states.

These suction and exhaust pressure states are differently acting on the check valves 80 and 82 in the openings and responsive to these pressure variations. That is, when piston 76 moves rearwardly in response to the excitation of the electromagnetic 78, valve 80 opens and valve 82 closes. Thus, air is drawn into the chamber 70 through inlet 71. When piston 76 moves forwardly under influence of spring 84, valve 82 opens and valve 80 closes so the air in chamber 70 is exhausted through outlet 74.

Feeding of the linear motor with an a.c. mains voltage of 50 or 60 Hz is effected via a connection line 48 which is run to the connections of the linear motor 12 through a sealing and insulating bushing 50 and via switching means 52. The switching means 52 preferably consist of a timer than can be controlled by an externally mounted proximity switch 54, or the like.

The proximity switch 54 is arranged on a holder 56 in the form of a quiver which is adapted to receive a soldering iron 58 when soldering is interrupted. The soldering iron 58 is equipped with an electric connection 60 via which it is supplied with the heating current required for heating its bit 62. Adjacent to the bit 62, there is provided a suction opening of a suction pipe 64 whose other end is connected to the soldering-vapor exhaust device illustrated in FIG. 1, via the suction line 46.

When the soldering iron 58 is picked up from the holder, for the purpose of soldering, then a signal is generated by the proximity switch 54 which causes the switching means 52 to switch on the linear motor instantaneously. When the soldering iron is placed back into the holder, upon completion or for interruption of the work, another signal is generated by the proximity switch 54 which has the result that the linear motor 12 is switched off with a time lag determined by the switching means 52 (timer).

In its operative condition, the linear motor 12 draws in air inside the housing 10, in the area between the mounting plate 18 and the separating plate 32, thereby producing a vacuum which propagates through the two filter arrangements 14, 16 and the suction line 46, right to the suction opening of the suction pipe 64 at the soldering iron 58.

Consequently, the soldering vapors developing during soldering are transported through the suction pipe 64 and the suction line 46 into the housing 10, and there initially through the particle filter 14, which is arranged between the separating plate 32 and the lid 40 in sealing relationship so that the air and the soldering vapors drawn in necessarily have to pass the filter material, and then through the filter arrangement 16 located inside the annular particle filter 14. All coarser particles are removed from the air flow by the particle filter 14. Any harmful and/or disturbing gases that have passed the particle filter 14 are then removed in the filter arrangement 16, together with any finer particles that may still be left. After having thus been cleaned mechanically and chemically, the air flows from the outlet of the filter arrangement 16 to the inlet of the linear motor 12, and then from the latter's outlet 20 via the outlet opening 22 into the outlet or expansion chamber 28. The expansion chamber 28, as well as the outlet pipe 30 connecting it with the outside, are sized in such a way as to largely balance out the pressure fluctuations encountered at the outlet 20 of the linear motor so that the expansion chamber 28 and the outlet pipe 30 act as a silencer, keeping the noise level in the environment of the exhaust device very low.

Preferably the silencer expansion chamber 28 may contain additional soundproofing material for additional noise suppression, e.g. flame-resistant felt means.

Figure 2:
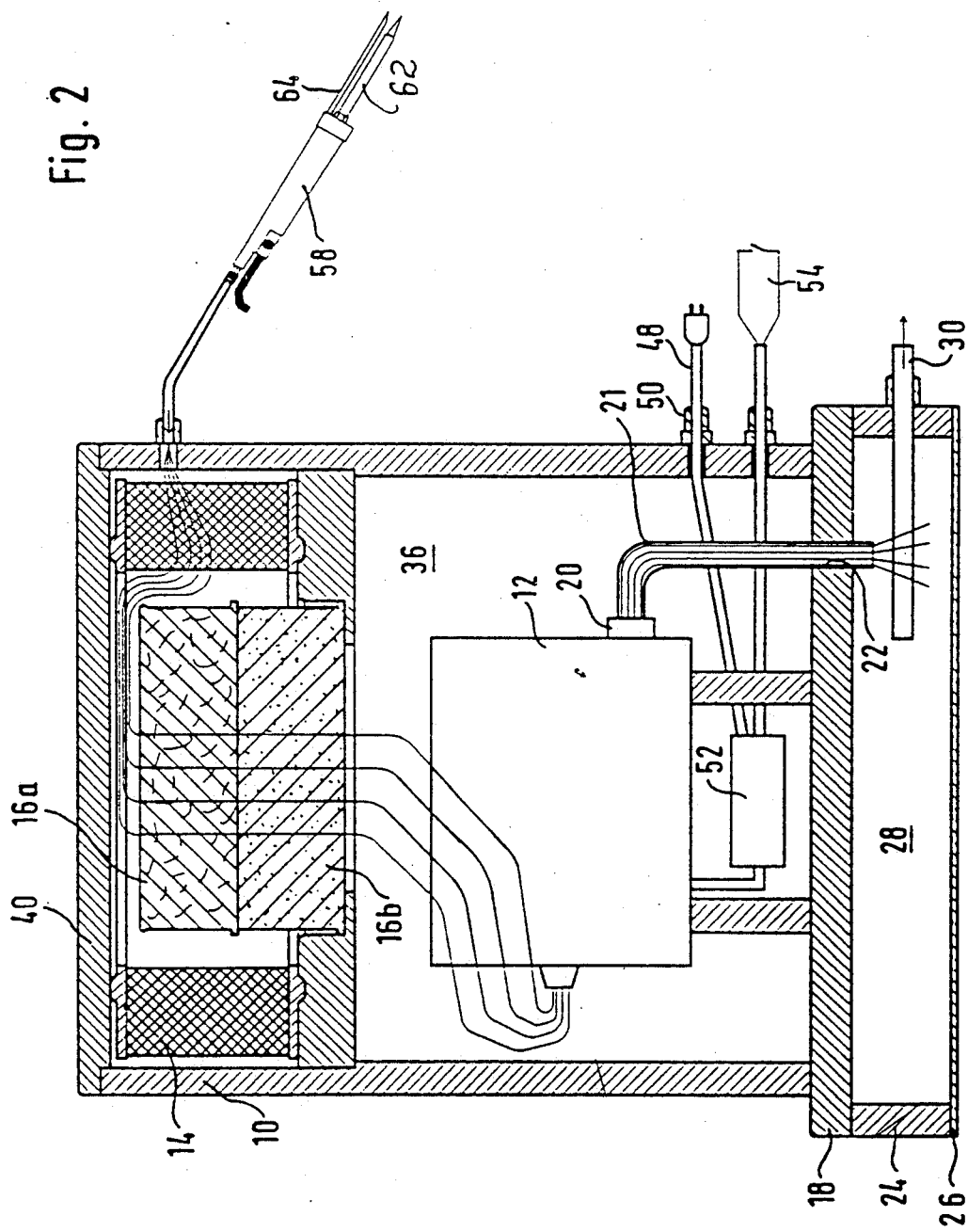
FIG. 2 shows a diagrammatic, axial longitudinal section through the soldering-vapor exhaust device according to FIG. 1, with a soldering iron equipped with a suction

In FIG. 2, the air current occurring during operation of the soldering-vapor exhaust device according to the invention is indicated by flow lines. It can be seen that the linear motor 12 is located in an intake chamber 36 defined between the mounting plate 18 and separating plate 32, directly in the path of the current from the filter arrangement 16 to the inlet of the linear motor 12. The aspirated air, having already been cleaned chemically and mechanically in the filter arrangements, forms a cooling-air flow for the linear motor whose exhaust air is guided directly into the outlet chamber 28 so that it does not contribute to heating up the linear motor 12 or the atmosphere in the intake chamber. In addition, parts of the described filter arrangements, or else additional filter arrangements, may be arranged in the outlet chamber 28 in order to ensure further cleaning of the exhaust air, for example from formaldehyde vapors, and to achieve a further improved silencing effect.

The above description shows that the invention succeeds in implementing an effective soldering-vapor exhaust device largely with the air of commercially available components, which produces comparatively little noise in operation and in which the vacuum generator consists of a linear motor that can be controlled directly in response to the operation of the associated soldering iron, it being understood that in view of the possibility to connect a plurality of soldering irons—in the case of the illustrated embodiment a total of three soldering irons—the electric switching means can be configured in such a way that the linear motor will be switched off only when, after at least one of the connected soldering irons has been used, all connected soldering iron have been placed back in their respective holders.

I claim:

1. A soldering-vapor exhaust device for a soldering iron having a soldering bit, comprising a suction pipe adapted to be mounted on the soldering iron and provided with a suction opening positioned adjacent to the soldering bit; a vacuum generator having filter means for filtering fluid flowing therethrough, and an intake chamber; and a suction line connecting said suction pipe with said vacuum generator; said vacuum generator comprising a linear motor in said intake chamber downstream of said filter means, said linear motor including a suction chamber, a reciprocating piston in said suction chamber for creating a suction as said piston moves from a first to a second position, and electromagnetic means for moving said piston.

2. Soldering-vapor exhaust device according to claim 1, wherein the said intake chamber (36) is configured in such a way that the air aspirated by the said linear motor (12) forms a cooling-air flow for the linear motor itself.

3. Soldering-vapor exhaust device according to claim 2, wherein an outlet (20) of the said linear motor (12) is directly connected to an exhaust air outlet (22) of the said intake chamber (36).

4. Soldering-vapor exhaust device according to claim 3, wherein the said exhaust air outlet (22) communicates with the ambient atmosphere via a silencer arrangement (28, 30).

5. Soldering-vapor exhaust device according to claim 4, wherein the said silencer arrangement (28, 30) comprises a filter unit.

6. Soldering-vapor exhaust device according to claim 1, wherein the said linear motor (12) further comprises switch means controlled in response to the operation of the soldering iron (58).

7. A soldering-vapor exhaust device according to claim 6, and a support for the soldering iron, wherein said switch means comprises a proximity switch provided on said support for switching on and off said linear motor.

8. Soldering-vapor exhaust device according to claim 7, wherein a delayed switching-off device (52) coacts with the said proximity switch (54).

9. Soldering-vapor exhaust device according to claim 1, wherein the said filter arrangements are composed of a course and a fine filter units (14, 16a, 16b).

10. Soldering-vapor exhaust device, according to claim 9, wherein the said fine filter arrangement (16) comprises a filter combination consisting of a microfilter (16a) and an activated charcoal filter (16b).

11. Soldering-vapor exhaust device according to claim 9, wherein one of the said filter units (14) is a paper filter.

12. Soldering-vapor exhaust device according to claim 1, wherein the said filter arrangements absorb formaldehyde vapors.

13. A soldering-vapor exhaust device according to claim 1, including a housing, said housing defining said intake chamber, the upper portion of said housing receiving said filter means therein, a sealing plate connecting said filter means in sealing engagement with said intake chamber, and a silencer chamber below said intake chamber.

14. Soldering vapor exhaust device according to claim 13, wherein said housing is tubular, said filter means comprising a course filter acting as a preliminary filter fitted in said upper filtering chamber in annular and sealing relationship, and receiving in its interior a fine filter combination consisting of a microfilter followed in downstream direction by an activated charcoal filter, so that aspirated and filtered air volumes pass from said activated charcoal filter into said intake chamber of the housing, through a central opening provided in said separating plate.

15. A soldering-vapor exhaust device according to claim 1, wherein an electromagnetic alternating field is generated by said electromagnetic coil, said chamber having air inlet and outlet openings including check valves arranged therein responsive to the movement of said piston in said suction chamber for alternately opening and closing said openings.

* * * * *